UNITED STATES PATENT OFFICE.

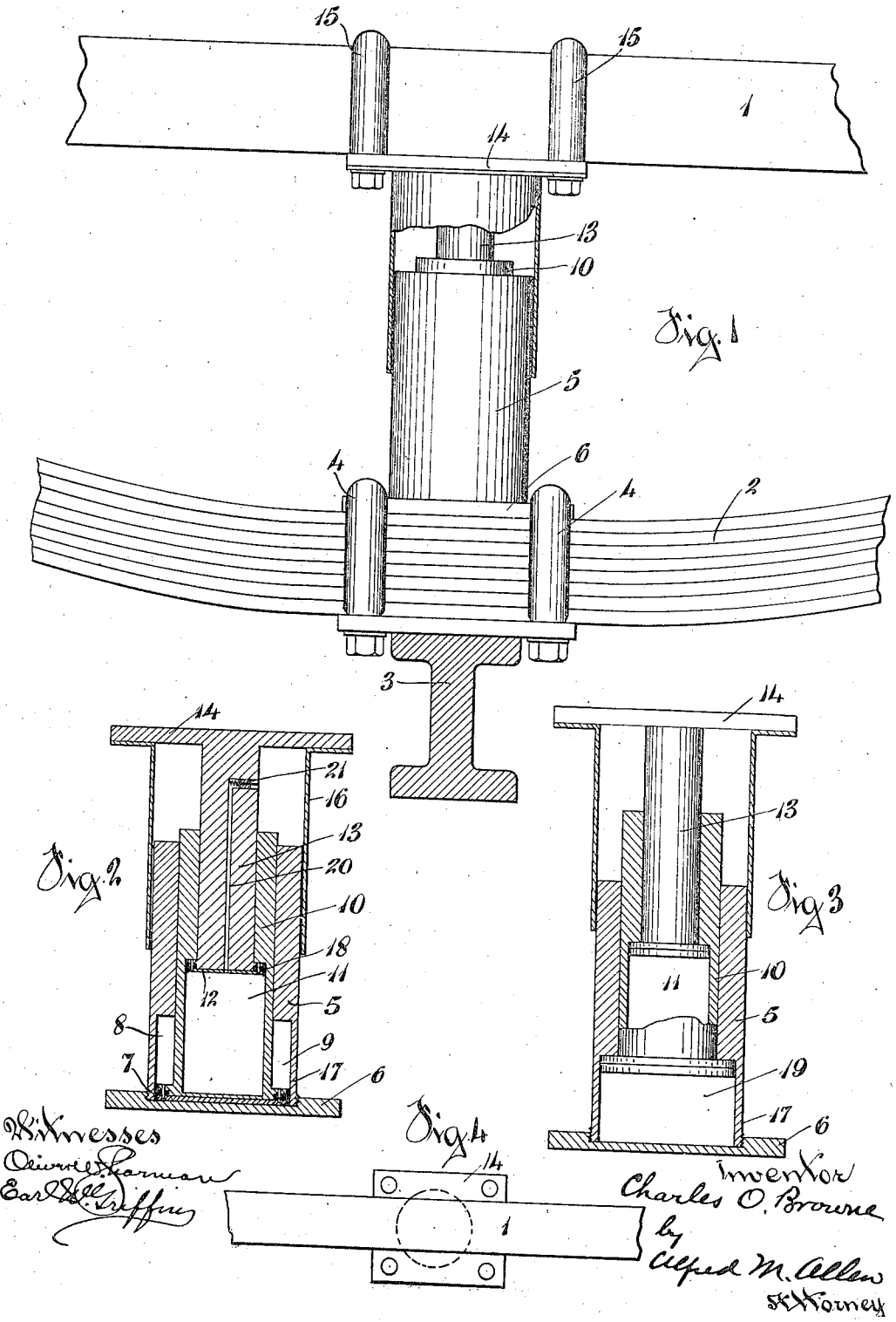
C. O. BROWNE.
SHOCK ABSORBER.
APPLICATION FILED NOV. 16, 1911.
1,028,185.
Patented June 4, 1912.

CHARLES O. BROWNE, OF NORWOOD, OHIO.

SHOCK-ABSORBER.

1,028,18:.

Specification of Letters Patent.

Patented June 4, 1912.

Application filed November 16, 1911. Serial No. 660,568.

*To all whom it may concern:*

Be it known that I, CHARLES O. BROWNE, a citizen of the United States, and a resident of the city of Norwood, in the county of Hamilton and State of Ohio, have invented certain new and useful Improvements in Shock-Absorbers, of which the following is a full, clear, and exact description, reference being had to the accompanying drawing, forming a part of this specification.

The object of my invention is to provide a shock absorber, or auxiliary spring construction to be interposed between the ordinary springs and the body of the vehicle, especially for automobiles and the like, in which the compression of the ordinary spring may be relieved by an air or liquid cushion and the recoil checked not only by an air cushion, but by vacuum pressure exerted against the force of the recoil.

The invention consists of that certain novel construction and arrangement of parts to be hereinafter particularly pointed out and claimed, whereby the compression and recoil of the ordinary spring is relieved by telescoping parts under air and vacuum pressure.

In the drawing, Figure 1 is a front elevation of my improved shock absorber as located between the spring and frame, with the dust covering in section. Fig. 2 is a central vertical section of the parts in their normal position. Fig. 3 is a similar section with the parts drawn out under the recoil.
Fig. 4 is a top plan view.

The frame or body of the vehicle is represented by 1, and a portion of an ordinary leaf spring by 2, which spring is mounted on the axle 3.

Mounted on the spring 2 and secured by clips 4, 4, is a cylindrical casing 5, closed at the bottom by the flanged plate 6, over the edges of which the clips 4, 4, engage for securing the casing in position. The body of the casing is screwthreaded at 7 and secured in a recess in the flanged plate 6 by being screwed thereon.

The lower portion of the casing 5 is provided with an enlarged recess 8, within which recess the head 9 of an inner cylinder 10 fits tightly with a sliding fit. The body of the cylinder 10 passes up through the outer cylindrical casing 5 and the lower portion of the inner cylinder is provided with the cylindrical recess 11 in which fits snugly the head 12 of a piston or plunger 13. The plunger extends up through the inner cylinder 10, and at its upper end is provided with the flanged plate 14 for securing the plunger by clips 15, 15, to the frame 1. The telescoping parts are also provided with a sheet metal casing 16, depending from the plate 14 and surrounding the outer cylinder 5, to serve as a dust protector. The head 9 of the inner cylinder and the head 12 of the plunger are each provided with a suitable washer 17, 18, to make an air tight fit between the sliding parts.

When the parts are fitted together in their normal position as shown in Fig. 2, the cylinder 10 will be at its lowest position, with the head 9 at the bottom of its recess resting on the plate 6, and the head 12 of the piston in its uppermost position with the head engaging under the shoulder on the inner surface of the cylinder 10 formed by the recess 11. In this position, the recess 11 below the head 12 of the piston will be filled with air, and the recess 8 above the head 9 and outside the inner cylinder will also be filled with air, while the air will be exhausted below the head 9.

With the shock absorber mounted as above described intermediate the parts subjected to the movement of the spring, it will be obvious that as the body of the vehicle approaches the axle, the plunger 13 will compress the air in the recess 11, and thus there will be a cushion for the spring. Upon the recoil, the head of the plunger will raise the inner cylinder 10 as shown in Fig. 3, and the air in the recess 8 above the head 9 in this upward movement will also serve as a cushion for the upward movement, while at the same time the vacuum space 19 below the head 9 will cause the outer air pressure to tend to force the cylinder back to its normal position, and thus the recoil will be checked.

For the purpose of introducing a compressible medium into the chamber 11, or for primarily pumping compressed air into the chamber, I provide a passageway 20 through the piston 13. This passageway is provided with a check valve 21, opening inwardly to hold the medium under compression.

Instead of employing my device as a shock absorber, it will be understood, of course, that the devices may be employed as primary spring devices to be interposed wherever desired, and it will also be evident that when used either as a shock absorber or primary spring, they may be introduced and mounted between the parts to be rendered resilient, and that the particular location of my device as illustrated is by no means of the essence of my construction.

Having thus described my invention, what I claim as new and desire to secure by Letters Patent, is:

1. In a shock absorber, a compression cylinder closed at its inner end, and provided with a piston, adapted to engage the head of the cylinder, an outer cylindrical casing in which the compression cylinder is fitted to reciprocate, with a vacuum chamber in the outer casing beyond the compression cylinder, whereby the movement of the piston in one direction will draw out the compression cylinder against the vacuum pressure.

2. In a device of the character specified, in combination with members to be resiliently supported, a plunger secured to one member, and an outer casing secured to the other member, with an intermediate casing fitting within the outer casing and within which intermediate casing the plunger is fitted, means connecting the plunger and intermediate casing to cause the plunger to engage and draw out the intermediate casing upon the reverse movement of the plunger, the parts having a close sliding engagement, with the intermediate casing under the plunger filled with a compressible medium and a vacuum chamber in the outer casing beyond the intermediate casing.

3. In a device of the character specified, in combination with members to be resiliently supported, a plunger secured to one member, and an outer casing secured to the other member, with an intermediate casing fitting within the outer casing and within which intermediate casing the plunger is fitted, the plunger having a head to engage and draw out the intermediate casing upon the reverse movement of the plunger, the moving parts having a close sliding engagement with each other, with the intermediate casing under the plunger filled with a compressible medium and a vacuum chamber in the outer casing beyond the intermediate casing.

CHARLES O. BROWNE.

Attest:
MARSTON ALLEN,
EARL W. GRIFFIN.